Oct. 9, 1951        G. C. MILLER        2,570,583
CONVEYER FLIGHT
Filed Nov. 17, 1947
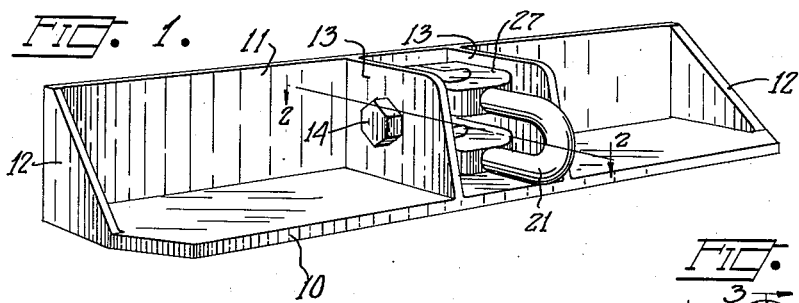
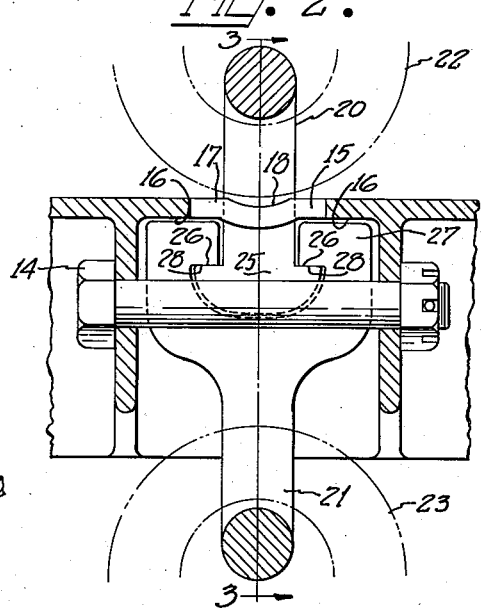
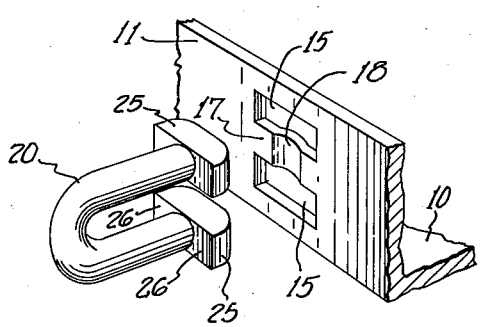
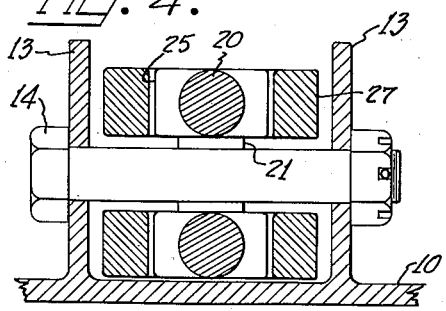
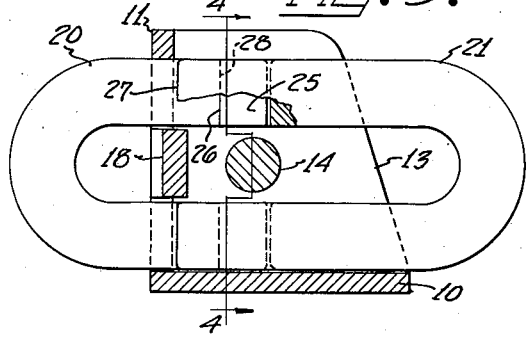
INVENTOR
GLENN C. MILLER
BY *Cook and Schermerhorn*
ATTORNEYS Patented Oct. 9, 1951

2,570,583

UNITED STATES PATENT OFFICE 2,570,583

CONVEYER FLIGHT

Glenn C. Miller, Portland, Oreg.

Application November 17, 1947, Serial No. 786,495

7 Claims. (Cl. 198—176)

This invention relates to improvements in conveyors and has particular reference to insertable flights for chain conveyors.

Various types of insertable flights have heretofore been used in chain conveyors, and the objects of the present invention are, in general, to provide an insertable flight of greater ruggedness and durability, a flight which can easily be inserted and removed from the conveyor, a flight which is simple and inexpensive to manufacture, and improvements in the form of the connection with the conveyor chain to avoid high stresses in the flight itself and to maintain a strength in the connecting parts substantially equal to the strength of the chain links between the flights.

In its preferred embodiment, the invention comprises a pair of U-shaped connecting links adapted for interengagement by means of male and female parts on the links to form a complete chain link in the line of draft of the conveyor chain. The draft of the chain is transmitted to the conveyor flight by the bearing of certain parts of the present novel link construction directly against the flight itself without relying upon intermediate parts or additional members to accomplish this function. The U-shaped links are locked in place in their proper relation with the conveyor flight by a single keeper bolt which serves only as a locking key and not as a draft connection. Since the keeper bolt is not subjected to draft stresses, it is not deformed or worn from use or overloading of the conveyor and may be easily removed at any time when it is desired to remove the flight.

Still other objects and advantages will be apparent from the following description with reference to the accompanying drawings illustrating a preferred embodiment of the invention. It is to be understood, however, that various changes may be made in the construction and arrangement of parts and that all such modifications within the scope of the appended claims are included in the invention.

In the drawings:

Figure 1 is a perspective view of a conveyor flight embodying the present invention;

Figure 2 is a sectional view taken on the line 2—2 of Figure 1;

Figure 3 is a sectional view taken on the line 3—3 of Figure 2;

Figure 4 is a sectional view taken on the line 4—4 of Figure 3; and

Figure 5 is a fragmentary perspective view showing one of the detachable links in a position to be inserted in a conveyor flight.

In the application of the present invention, a number of flights of the type herein illustrated are inserted at intervals in an endless conveyor chain which is trained around sprocket wheels or the like and driven by a prime mover for the purpose of transporting material. The flight itself comprises an angle iron bar having a horizontal flange 10 adapted to slide on a surface upon which the material is deposited and a vertical flange 11 to push a quantity of the material ahead of the flight as the chain moves. The vertical flange 11 is braced by a pair of end webs 12 and a pair of central webs 13. The webs 13 are apertured to receive a keeper bolt 14. Between the central webs 13 the vertical flange 11 is apertured to provide two rectangular openings 15 one above the other, as shown in Figure 5. The openings 15 do not extend to the webs 13, whereby bearing surfaces 16 are left on the inside of the flange 11 between each end of each opening 15 and the adjacent web 13. Between the openings 15 there is left a horizontal bar 17 comprising the material of the flange 11, and the central part of this bar is preferably deformed in an arch 18 projecting rearwardly of the flange 11.

The detachable links to be used with this flight comprise a male link 20 and a female link 21, each being of U-shape and adapted to interengage slidingly to form a complete chain link. The male link 20 is inserted through the last complete chain link 22 on the leading side of the flight, and the female link 21 is inserted through the last complete link 23 on the trailing side of the flight to establish a draft connection between the links 22 and 23 and to include the conveyor flight in such connection.

The end of each leg or shank of the male link 20 is provided with an enlarged head 25 having shoulders with bearing surfaces 26 extending laterally on either side of the link with respect to the normal vertical plane of the link in use. Each leg of the female link 21 is provided with an enlarged head in the form of a yoke 27 having spaced shoulders with bearing surfaces 28 to engage the bearing surfaces 26 on the male link. The end of each yoke in the female link is open to receive one of the shanks of the male link between the bearing surfaces 28 in sliding engagement perpendicular to the line of draft, as best shown in Figure 2.

The parts are connected together by first inserting the heads 25 of the male link through the openings 15 in the vertical flange of the flight, as shown in Figure 5. The female link 21 may then be dropped vertically into place on the rear side of the flange 11 so that the heads 25 are received in the respective yokes 27. The spacing of the webs 13 is slightly greater than the width of the yokes 27 in order to loosely receive and center the connecting links in the flight, and the heads 25 are just slightly smaller than the openings 15 to pass readily therethrough without having an unnecessary enlargement of these openings. The recess in the arch 18 allows clearance for the thickness of the link 22 so that the parts may be easily fastened together without making the link 20 abnormally long.

Thus, when the links 20 and 21 are connected and draft is applied to the male link 20 the bearing surfaces 26 on the heads 25 engage the bearing surfaces 28 on the yokes 27 to pull the ends of these yokes into engagement with the bearing surfaces 16 on the rear side of the vertical flange of the flight. In this way, the tractive effort exerted on each flight is not applied to the webs 13 but directly to the material engaging flange of the flight. The keeper bolt 14, which is inserted after the parts are connected in the manner described, carries no draft load or chain tension load and serves only to prevent disengagement of the links 20 and 21. For this purpose the shank of the bolt 14 has a diameter slightly less than the vertical spacing of the heads 25 and yokes 27.

The present design of the parts enables the strength of the conveyor chain to be maintained in the flight connecting links and does not subject any part of the conveyor flights to the chain tension. The stress on each flight is limited to the resistance or drag imposed by the material engaged by that particular flight, and it is not affected by the loads on the other flights.

Having now described my invention and in what manner the same may be used, what I claim as new and desire to protect by Letters Patent is:

1. In a conveyor, a flight having a wall perpendicular to the line of draft, openings in said wall, a chain link having portions extending through said openings, a link detachably connected with said first link in sliding engagement perpendicular to the line of draft to sustain chain tension in said conveyor and bearing against said wall to provide draft for said flight, and a keeper bolt in said flight independent of said tension and said draft for securing said parts together.

2. In a conveyor, a flight having a wall perpendicular to the line of draft, openings in said wall, a U-shaped link having male heads on its shanks extending through said openings, a second U-shaped link having female heads on its shanks, said female heads having shoulders perpendicular to the line of draft engageable with said male heads to sustain chain tension in said links, said female heads bearing against said wall to provide draft for said flight, and a keeper bolt in said flight extending loosely between said shanks to hold all of said parts in assembled relation.

3. In a conveyor, a pair of U-shaped links, male heads on the shanks of one of said links, female heads on the shanks of the other link having shoulders perpendicular to the line of draft in the conveyor to engage said male heads in a sliding connection and sustain chain tension in said links, and flight engaging surfaces on said female heads to provide draft for a flight on said conveyor.

4. In a conveyor, a flight having an opening therein, a chain link having a portion thereof extending through said opening, and a second link detachably connected with said portion of said first link in sliding engagement perpendicular to the line of draft, said second link having a portion larger than said opening to engage said flight and transmit draft thereto.

5. In a conveyor, a flight having an opening therein, a draft chain having a link with a male head extending through said opening, and a link in said chain having a female head detachably connected with said male head in sliding engagement perpendicular to the line of draft, said female head being larger than said opening so as to engage said flight and transmit draft thereto.

6. In a conveyor, a flight having an integral wall perpendicular to the line of draft, a pair of openings in said wall, a draft chain having a U-shaped link with the ends of said link extending through said openings and projecting beyond said wall, and a second U-shaped link in said chain detachably connected with said ends of said first link in sliding engagement perpendicular to the line of draft beyond said wall, whereby said two U-shaped links form a closed link attaching said flight to said chain.

7. In a conveyor, a flight having a wall perpendicular to the line of draft, openings in said wall, a U-shaped chain link having portions extending through said openings and projecting beyond said wall, a link detachably connected with said projecting portions of said first link in sliding engagement perpendicular to the line of draft to sustain chain tension in said conveyor, a pair of perpendicular webs projecting from said wall on opposite sides of said links, and a keeper extending through said webs and chain links to hold the parts in assembled relation.

GLENN C. MILLER.

REFERENCES CITED

The following references are of record in the file of this patent:

UNITED STATES PATENTS

| Number | Name | Date |
|---|---|---|
| 258,722 | Dodge | May 30, 1882 |
| 499,527 | Dodge | June 13, 1893 |
| 1,850,686 | Pangborn | Mar. 22, 1932 |
| 2,278,853 | Hudson | Apr. 7, 1942 |
| 2,294,080 | Ehmann | Aug. 25, 1942 |

FOREIGN PATENTS

| Number | Country | Date |
|---|---|---|
| 538,974 | Germany | Nov. 19, 1931 |